United States Patent
Pu et al.

(10) Patent No.: US 12,477,511 B2
(45) Date of Patent: Nov. 18, 2025

(54) MESSAGE NOTIFICATION METHOD, TERMINAL, AND NETWORK DEVICE

(71) Applicant: VIVO MOBILE COMMUNICATION CO., LTD., Guangdong (CN)

(72) Inventors: Wenjuan Pu, Chang'an Dongguan (CN); Xuanbing Liu, Chang'an Dongguan (CN); Wei Bao, Chang'an Dongguan (CN); Xiaodong Yang, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 475 days.

(21) Appl. No.: 17/855,645

(22) Filed: Jun. 30, 2022

(65) Prior Publication Data

US 2022/0338161 A1    Oct. 20, 2022

Related U.S. Application Data

(63) Continuation of application No. PCT/CN2021/072649, filed on Jan. 19, 2021.

(30) Foreign Application Priority Data

Jan. 20, 2020 (CN) .......................... 202010067883.3

(51) Int. Cl.
*H04W 68/00* (2009.01)
*H04W 4/20* (2018.01)
(Continued)

(52) U.S. Cl.
CPC ......... *H04W 68/005* (2013.01); *H04W 24/08* (2013.01); *H04W 68/00* (2013.01)

(58) Field of Classification Search
CPC .... H04W 68/005; H04W 24/08; H04W 68/00
See application file for complete search history.

(56) References Cited

U.S. PATENT DOCUMENTS

| 2010/0153269 A1 | 6/2010 | McCabe |
| 2012/0040639 A1 | 2/2012 | Brisebois |
| (Continued) | | |

FOREIGN PATENT DOCUMENTS

| CN | 101005692 A | 7/2007 |
| CN | 101026878 A | 8/2007 |
| (Continued) | | |

OTHER PUBLICATIONS

JP Office Action dated Oct. 17, 2023 as received in Application No. 2022-544192.
(Continued)

*Primary Examiner* — Xuan Lu
(74) *Attorney, Agent, or Firm* — BROOKS KUSHMAN P.C.

(57) ABSTRACT

A message notification method, a terminal, and a network device are provided. The message notification method includes: determining whether a first condition is met; and sending a notification message to a first network when the first condition is met, or skipping sending a notification message to a first network when the first condition is not met. The first condition includes any one of the following: a notification message reporting condition; and a first timer expires or is not running, where the first timer is used to prohibit a terminal from sending the notification message.

19 Claims, 4 Drawing Sheets

---

Determine whether a first condition is met    101

Send a notification message to a first network when the first condition is met; or skip sending a notification message to a first network when the first condition is not met    102

(51) Int. Cl.
      *H04W 24/02*    (2009.01)
      *H04W 24/08*    (2009.01)
      *H04W 28/02*    (2009.01)
      *H04W 36/00*    (2009.01)
      *H04W 36/14*    (2009.01)
      *H04W 48/10*    (2009.01)
      *H04W 88/06*    (2009.01)

(56) References Cited

U.S. PATENT DOCUMENTS

| | | | |
|---|---|---|---|
| 2013/0267234 A1 | 10/2013 | Choi | |
| 2014/0067708 A1 | 3/2014 | Lau et al. | |
| 2016/0025487 A1 | 1/2016 | Zhang | |
| 2017/0325278 A1 | 11/2017 | Ramkumar et al. | |
| 2019/0174458 A1 | 6/2019 | Liu et al. | |
| 2020/0005355 A1 | 1/2020 | Pei | |
| 2020/0037380 A1 | 1/2020 | Qiu et al. | |
| 2020/0221329 A1* | 7/2020 | Kim | H04W 12/037 |
| 2022/0053448 A1* | 2/2022 | Velev | H04W 8/183 |
| 2022/0394459 A1 | 12/2022 | Jin et al. | |
| 2022/0418020 A1* | 12/2022 | Adjakple | H04W 8/24 |
| 2023/0057408 A1* | 2/2023 | Ramachandra | H04W 24/10 |

FOREIGN PATENT DOCUMENTS

| | | | |
|---|---|---|---|
| CN | 104303549 A | 1/2015 | |
| CN | 104330549 A | 2/2015 | |
| CN | 110300434 A | 10/2019 | |
| JP | 2023-501337 A | 1/2023 | |
| KR | 20190131547 A | 11/2019 | |
| WO | 2018/176675 A1 | 10/2018 | |
| WO | 2021/088675 A1 | 5/2021 | |

OTHER PUBLICATIONS

Vivo., "Solution for UE initiated leave and return a network for key issue#3," SA WG2 Meeting #136AH, S2-2000132 (was S2-190983), pp. 1-4, (Jan. 13-17, 2020).

Vivo et al., "Solution for UE initiated leave and return a network for key issue#3," SA WG2 Meeting #136AH, S2-2001638 (was S2-2001421/S2-2000132/ S2-190983), pp. 1-3, (Jan. 17, 2020).

JP Office Action dated May 23, 2023 as received in Application No. 2022-544192.

Extended European Search Report dated Jun. 6, 2023 as received in Application No. 21744959.4.

First Office Action for Korean Application No. 10-2022-7025904, dated Apr. 2, 2024, 5 Pages.

3GPP "3rd Generation Partnership Project; Technical Specification Group Radio Access Network; Evolved Universal Terrestrial Radio Access (E-UTRA); Radio Resource Control (RRC); Protocol specification (Release 15)" 3GPP TS 36.331 V15.8.0 (Dec. 2019), 2019, 947 Pages.

Ericsson "UE Assistance Information for UE preferred cDRX configuration" 3GPP TSG-RAN2 Meeting #107, Prague, Czech Republic, Aug. 2019, R2-1909990, 5 Pages.

Ericsson, et al. "MUSIM solutions for Key Issue 3" SA WG2 Meeting #136-AH, Incheon, Korea, Jan. 2020, S2-2000303, 9 Pages.

Chinese Office Action dated Nov. 24, 2021 as received in application No. 202010067883.3.

International Search Report and Written Opinion dated Apr. 15, 2021 as received in application No. PCT/CN2021/072649.

* cited by examiner

MESSAGE NOTIFICATION METHOD, TERMINAL, AND NETWORK DEVICE

CROSS-REFERENCE TO RELATED APPLICATIONS

This application is continuation application of PCT International Application No. PCT/CN2021/072649 filed on Jan. 19, 2021, which claims priority to Chinese Patent Application No. 202010067883.3, filed in China on Jan. 20, 2020, which is incorporated herein by reference in its entirety.

TECHNICAL FIELD

The present invention relates to the field of communications technologies, and in particular, to a message notification method, a terminal, and a network device.

BACKGROUND

In the prior art, multi-card terminals have become increasingly common. A multi-card terminal may have two or more SIM cards. The multi-card terminal may perform switching between networks corresponding to different SIM cards. Currently, when a multi-card terminal performs switching between different networks, the multi-card terminal usually leaves from or returns to a corresponding network directly. Therefore, although the multi-card terminal may have left a network, the network may still schedule or page the multi-card terminal, resulting in a waste of network resources.

SUMMARY

According to a first aspect, an embodiment of the present invention provides a message notification method, applied to a terminal and including:
  determining whether a first condition is met; and
  sending a notification message to a first network when the first condition is met; or
  skipping sending a notification message to a first network when the first condition is not met; where
  the first condition includes any one of the following:
  a notification message reporting condition; or
  a first timer expires or is not running, where the first timer is used to prohibit the terminal from sending the notification message.

According to a second aspect, an embodiment of the present invention provides a message notification method, applied to a network device and including:
  receiving a notification message specific to a first network from a terminal, where
  the notification message is sent by the terminal when a first condition is met, and the first condition includes any one of the following:
  a notification message reporting condition; or
  a first timer expires or is not running, where the first timer is used to prohibit the terminal from sending the notification message.

According to a third aspect, an embodiment of the present invention provides a terminal, including:
  a first determining module, configured to determine whether a first condition is met; and
  a sending module, configured to: send a notification message to a first network when the first condition is met, or skip sending a notification message to a first network when the first condition is not met; where
  the first condition includes any one of the following:
  a notification message reporting condition; or
  a first timer expires or is not running, where the first timer is used to prohibit the terminal from sending the notification message.

According to a fourth aspect, an embodiment of the present invention provides a network device, including:
  a receiving module, configured to receive a notification message specific to a first network from a terminal, where
  the notification message is sent by the terminal when a first condition is met, and the first condition includes any one of the following:
  a notification message reporting condition; or
  a first timer expires or is not running, where the first timer is used to prohibit the terminal from sending the notification message.

According to a fifth aspect, an embodiment of the present invention provides a terminal, including a memory, a processor, and a computer program stored in the memory and capable of running on the processor, where when the computer program is executed by the processor, the steps of the foregoing message notification method may be implemented.

According to a sixth aspect, an embodiment of the present invention provides a computer-readable storage medium, where a computer program is stored in the computer-readable storage medium, and when the computer program is executed by a processor, the steps of the foregoing message notification method may be implemented.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
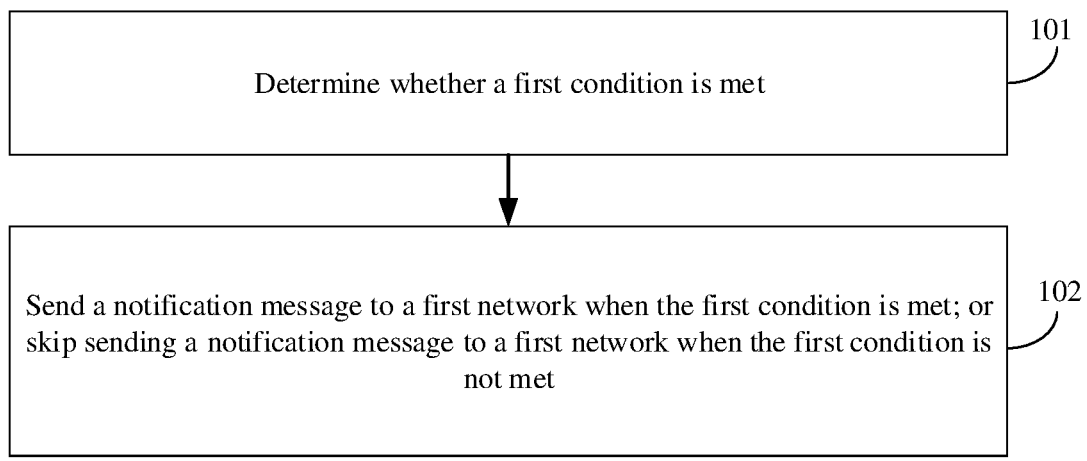
FIG. 1 is a flowchart of a message notification method according to an embodiment of the present invention.

The technologies described in this specification are not limited to 5th generation (5G) mobile communications systems and subsequent evolved communications systems, and not limited to LTE/LTE-Advanced (LTE-A) systems, and may also be used in various wireless communications systems, such as a code division multiple access (CDMA) system, a time division multiple access (TDMA) system, a frequency division multiple access (FDMA) system, an orthogonal frequency division multiple access OFDMA) system, a single carrier frequency division multiple access (SC-FDMA) system, and other systems.

For better understanding of the embodiments of the present invention, the following technical points are described first.

A multi-card terminal refers to a device (for example, a commercial device) with a plurality of (that is, two or more) SIM cards. The plurality of SIM cards may be from a same operator or different operators. The plurality of SIM cards may be physical cards, or may be virtual cards, for example, eSIM. Generally, common requirements include but are not limited to the following ones.

Business travel: A mobile phone of a user supports a plurality of SIM cards. After reaching a destination, the user purchases a new SIM card locally for answering and making local calls and for data connections at the travel destination.

In addition, an original SIM card is used to answer a call and receive a short message.

Daily work and life: A mobile phone of a user supports a plurality of SIM cards. For example, one SIM card is used for work contact, and a call from this SIM card is preferentially answered during working hours; another SIM card is used for daily life, such as ordering a takeout and purchasing daily supplies online. This prevents an incoming call such as an advertising promotion call from affecting a work-related incoming call.

Daily high traffic use: A mobile phone of a user supports a plurality of SIM cards. For example, one SIM card is used to purchase a high-traffic package for daily Internet access, and another SIM card is mainly used for answering and making calls and the like.

Communication services on a plurality of SIM cards of a multi-card terminal are limited by a capability of the terminal. Therefore, multi-card terminals are classified into multi-SIM UEs supporting single-transmit and single-receive, multi-SIM UEs supporting single-transmit and dual-receive, and the like. The multi-SIM UEs supporting single-transmit and single-receive mean that the UEs can send or receive data on only one network at a time. The multi-SIM UEs supporting single-transmit and dual-receive mean that the UEs can send data on only one network at a time and may receive data on two networks simultaneously. Apparently, there are more limitations on the multi-SIM UEs supporting single-transmit and single-receive when two SIM cards are used for communication.

From a perspective of a protocol, a multi-card terminal is a plurality of UEs (corresponding to a plurality of SIM cards) integrated into one physical entity (terminal) by using an implementation technology. Therefore, each card of a multi-card terminal corresponds to one network and one UE. For example, a SIM card 1 is on a network A, and a corresponding UE entity is UE1; and a SIM card 2 is on a network B, and a corresponding UE entity is UE2. UE (which may also be referred to as a SIM card) of a multi-card terminal has a radio resource control (RRC) state on a network, for example, an idle state (Idle), an inactive state (Inactive), or a connected state (Connected).

A dual-card terminal (for example, including UE1 and UE2) with a single-transmit capability is used as an example. A corresponding RRC state combination may include but is not limited to the following:

(1) The UE1 (or a SIM card 1) is in an idle state, and the UE2 (or a SIM card 2) is in an idle state.
(2) The UE1 (or a SIM card 1) is in an idle state, and the UE2 (or a SIM card 2) is in an inactive state.
(3) The UE1 (or a SIM card 1) is in an idle state, and the UE2 (or a SIM card 2) is in a connected state.
(4) The UE1 (or a SIM card 1) is in an inactive state, and the UE2 (or a SIM card 2) is in an inactive state.
(5) The UE1 (or a SIM card 1) is in an inactive state, and the UE2 (or a SIM card 2) is in a connected state.
(6) The UE1 (or a SIM card 1) in a connected state with connection suspended, and the UE2 (or a SIM card 2) is in a connected state and is executing a high-priority service.

It can be understood that only one UE/SIM card of the dual-card terminal with the single-transmit capability can be in the RRC connected state and send and receive data at a same time due to a capability limitation.

In specific implementation, when UE is in the idle state or the inactive state, the UE may monitor a physical downlink control channel (PDCCH) of a network at a paging occasion (PO) of the UE and receive a paging message accordingly, to learn of whether there is paging for the UE at this time.

For switching of a multi-card terminal with dual-receive between networks, at least the following scenarios may exist:

(1) UE1 is in a connected state on a network A, and UE2 is in an idle state or an inactive state on a network B.

If the UE2 is about to execute a high-priority service on the network B when the UE1 is executing a service in the connected state on the network A, before the UE2 enters the connected state to execute the high-priority service on the network B, the UE1 may notify the network A that the UE1 temporarily suspends the service on the network A (the network A considers that the UE1 leaves the network for a period of time). After the service of the UE2 on the network B is completed, the UE1 may notify the network A that the UE1 continues executing the service suspended on the network A (the network A considers that the UE1 returns to the network).

(2) UE1 is in an idle state or an inactive state on a network A, and UE2 is in an idle state or an inactive state on a network B.

When the UE2 in the idle state or the inactive state receives a paging (paging) message from the network B (or the UE2 triggers a high-priority service on the network B) and is about to enter the connected state to start a service on the network B, the UE1 may notify the network A that the UE1 temporarily stops receiving a paging message on the network A (the network A considers that the UE1 leaves the network for a period of time). After the service of the UE2 on the network B is completed, the UE1 may notify the network A that the UE1 continues receiving a paging message on the network A (the network A considers that the UE1 returns to the network).

The foregoing two scenarios describe that when the UE1 leaves or returns to the network A, the UE1 may send a notification to the network A to notify the network A that the UE1 does not receive scheduling or paging temporarily. Similarly, in another case, the UE2 may also leave or return to the network B. This is not limited in the embodiments.

Optionally, a wireless communications system includes a terminal and a network device in the embodiments of the present invention. The terminal may also be referred to as a terminal device or user equipment. The terminal may be a terminal-side device such as a mobile phone, a tablet personal computer, a laptop computer, a personal digital assistant (PDA), a mobile Internet device (MID), a wearable device, or a vehicle-mounted device. It should be noted that a specific type of the terminal is not limited in the embodiments of the present invention. The network device may be a base station or a core network. The base station may be a base station in 5G or a later version (for example, a gNB or a 5G NR base station), or a base station in another communications system (for example, an eNB, a WLAN access point, or another access point). A base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, or another proper term in the field, which is not limited to a specific technical term provided that same technical effects are achieved.

The following describes the embodiments of the present invention in detail with reference to the accompanying drawings.

Referring to FIG. 1, FIG. 1 is a flowchart of a message notification method according to an embodiment of the present invention. The method is applied to a terminal (for example, a multi-card terminal). As shown in FIG. 1, the method includes the following steps.

Step 101: Determine whether a first condition is met.

Step 102: Send a notification message to a first network when the first condition is met; or skip sending a notification message to a first network when the first condition is not met.

The first condition may include any one of the following:
a notification message reporting condition; or
a first timer expires or is not running, where the first timer is used to prohibit the terminal from sending the notification message.

In this way, during switching between different networks, when a specific condition is met, the terminal may send a notification message to notify a network whether to suspend a connection or suspend paging, thereby reducing wastes of network resources. Further, the notification message reporting condition and/or a timer may also be used to reduce a notification message reporting frequency, so as to avoid frequently receiving notification messages sent by a multi-card terminal in a case of network congestion and avoid signaling overload on a corresponding network.

Optionally, the foregoing notification message may be used to indicate leaving a network or returning to a network, and may include at least one of a leaving message or a return message. The leaving message is used by the terminal to indicate that UE (a SIM card) corresponding to the network temporarily leaves the network and does not receive scheduling and/or does not monitor a paging message during a leaving period; or to indicate the network not to schedule the terminal or page the terminal. Optionally, a time range may be further provided to indicate not to schedule the terminal or page the terminal during the time range. The return message is used by the terminal to indicate that the UE (the SIM card) corresponding to the network returns to the network and may continue receiving scheduling or continue monitoring a paging message.

Moreover, in addition to defining the notification message as the leaving message and/or the return message (other names may be used for the leaving message and the return message), the notification message may be used to directly indicate leaving a network or returning to a network. This is not limited in the embodiments of the present invention.

In an implementation, the notification message, for example, the leaving message or the return message, may be sent in any uplink message. For example, when being sent through an RRC message or an NAS message, the leaving message may be optionally 1 bit, with 0 indicating not scheduling the terminal and 1 indicating not paging the terminal; and the return message may be represented by 1 bit, with 0 indicating that the terminal may be scheduled again and 1 indicating that the terminal may be paged again. Alternatively, the notification message may be represented by 2 bits. When the first bit is 0, it indicates not scheduling the terminal; and when the first bit is 1, it indicates that the terminal may be scheduled again. When the second bit is 0, it indicates not paging the terminal; and when the second bit is 1, it indicates that the terminal may be paged again.

Optionally, the foregoing notification message reporting condition may include any one of the following:
a service type of paging received by the terminal from a second network is a preset service type;
a service type triggered by the terminal on a second network is a preset service type;
the terminal receives paging from a second network;
the terminal initiates a service on a second network;
the terminal ends a service conforming to a preset service type on a second network; or
the terminal ends a service on a second network.

It should be noted that the first network and the second network correspond to different SIM cards in the multi-card terminal. For example, the first network is a network corresponding to any SIM card, and the second network is a network corresponding to any SIM card other than the SIM card corresponding to the first network. For another example, the first network is a network corresponding to a SIM card 1, and the second network is a network corresponding to a SIM card 2 different from the SIM card 1. Alternatively, the first network is a network corresponding to a SIM card 2, and the second network is a network corresponding to a SIM card 1 different from the SIM card 2.

In a specific rule in a protocol or a specific network configuration, the first network and the second network may not be mentioned. However, in this case, the terminal may distinguish between the first network and the second network, that is, distinguish between networks corresponding to the different SIM cards, and perform a corresponding operation.

In addition, the first network and the second network may further be from a same operator or different operators and may further belong to a same network type or different network types.

For example, the first network is from an operator 1, and the second network is from an operator 2; alternatively, the first network is from an operator 2, and the second network is from an operator 1; alternatively, the first network and the second network are both from an operator 1 (or an operator 2).

For another example, the first network is a long term evolution (LTE) network, and the second network is a 5th generation (5G) mobile communications network; alternatively, the first network is a 5G network, and the second network is an LTE network; alternatively, the first network and the second network are both LTE networks (or 5G networks).

In an implementation, the foregoing preset service type may include any one of the following: voice, short message (SMS), radio resource control (RRC) signaling, or non-access stratum (NAS) signaling.

In another implementation, the foregoing preset service type may be determined based on at least one of the following: a network configuration, a specified rule in a protocol, or a status of the terminal itself.

In an optional implementation of the present invention, the notification message reporting condition may be determined by the terminal based on at least one of the following:

a network configuration;

a specified rule in a protocol; or a status of the terminal itself.

For example, if no notification message reporting condition is configured by a network or specified in the protocol, the terminal may determine the notification message reporting condition by itself. The notification message is, for example, the leaving message or the return message.

In an implementation, UE1 is in a connected state on a network A. When the UE1 determines, based on a status of the UE1 itself, whether to send a leaving message to the network A, the UE1 may determine, by itself based on a service type included in a paging message on another network, for example, a network B on which UE2 is located, whether to send a leaving message to the network A; or the UE1 may determine, depending on a connection suspension status of the network A, whether to send a leaving message. For example, if no connection is suspended or a connection is suspended for a short time, the UE1 may choose not to send a leaving message to the network A.

In another implementation, UE1 is in an idle state or an inactive state on a network A. When the UE1 determines, based on a status of the UE1 itself, whether to send a leaving message to the network A, the UE1 may determine, by itself based on a service type included in a paging message on another network, for example, a network B on which UE2 is located, whether to send a leaving message to the network A.

Further, the network configuration may be sent by a corresponding network to the terminal by using any one of the following: broadcast system information or dedicated signaling. That is, the network configuration may be broadcast or sent in a form of dedicated signaling.

It can be understood that as an execution body, the terminal, in this embodiment of the present invention, although the terminal sends the notification message to the first network and the terminal receives the paging from the second network in the foregoing description, in fact, for the first network, UE that is on the first network and that is included by the terminal (for example, UE1, corresponding to a SIM card in the terminal that corresponds to the first network) sends the notification message, and for the second network, UE that is on the second network and that is included by the terminal (for example, UE2, corresponding to a SIM card in the terminal that corresponds to the second network) receives the paging.

In an implementation, a dual-card terminal and a condition limiting notification message reporting are used as examples. The dual-card terminal corresponds to UE1 and UE2. The UE1 is on a network A, and the UE2 is on a network B. When the UE2 has some service types on the network B, the UE1 sends a notification message to the network A. The content of the notification message includes but is not limited to at least one of the following information: a. the UE1 notifies the network A that the UE1 will stop receiving scheduling or monitoring a paging message on the network A; further, optionally, the UE1 stops receiving scheduling or monitoring a paging message on the network A for a period of time; b. the UE1 requires allocation of a time division multiplexing (TDM) pattern, for better interaction with the network A.

Further, some service types of the UE2 on the network B may be obtained through a paging message sent by the network B, or obtained through a service triggered by the UE2 on the network B. The service type includes but is not limited to voice, short message, RRC signaling, NAS signaling, or the like.

Further, a condition under which the UE1 sends the notification message to the network A may be determined by a network configuration, defined in a protocol, or determined by the UE1 itself. The network configuration may be configured by the network A or may be configured by the network B. For example, the network A configures whether to support notification message reporting by the UE1, and if notification message reporting by the UE1 is supported, the network A configures the network A to be notified when there is a specific service on the network B; alternatively, the network B configures the network A to be notified when there is a specific service on the network B. Based on a specified rule in the protocol, the condition may be that: when the UE2 has some services on the network B, the UE1 notifies the network A; or when the UE1 has some services on the network A, the UE2 notifies the network B that the UE2 will leave.

In an optional embodiment of the present invention, if a network receives a leaving message from UE, the network may consider that a service priority of the UE is low on the network at this time or that the UE will not return within a short period of time. Due to such consideration, the network does not want the UE to send a leaving message and/or a return message within a period of time T. After the period of time T has elapsed, the UE is allowed to send a leaving message and/or a return message. In this case, a timer (namely, the foregoing first timer) may be used and a corresponding UE behavior or a corresponding network behavior may be specified to prevent the UE from frequently sending notification messages to the network.

Optionally, the first timer may be merely used to prohibit the terminal from sending a leaving message, or be merely used to prohibit the terminal from sending a return message, or be used to prohibit the terminal from sending a leaving message and a return message. If the first timer is merely used to prohibit sending of a leaving message the UE does not send any leaving messages before the first timer expires, the UE needs to wait until the first timer expires, and then the UE is allowed to send a leaving message again. If the first timer is merely used to prohibit sending of a return message, the UE does not send any return messages before the first timer expires, the UE needs to wait until the first timer expires, and then the UE is allowed to send a return message again. If the first timer is used to prohibit sending of a leaving message and a return message, the UE does not send any return messages or leaving messages before the first timer expires, the UE needs to wait until the first timer expires and there is no paging from the corresponding network within this period, and the UE may send a return message. After that, the UE may also send a leaving message again.

Optionally, the first timer may be a timer in an existing protocol or a new timer. The first timer may be specified in a protocol or be configured for the terminal by using dedicated signaling or broadcast system information. Further, different first timers may be specified in the protocol for a plurality of services, different first timers may be configured by a network for a plurality of services, and different first timers may be configured for a plurality of UEs in a multi-card terminal.

Optionally, a startup condition of the first timer may be that the terminal sends the notification message to the first network. For example, when corresponding UE sends a notification message (a return message or a leaving message) to the first network, the first timer is started or restarted.

Optionally, a stop condition of the first timer may include any one of the following:

Running duration of the first timer reaches a preset threshold. For example, the preset threshold may be preset depending on an actual situation.

A new timer parameter value is reconfigured for the first timer. For example, the new timer parameter value may be defined in a protocol or may be configured by a network; and a network configuration may be delivered through broadcasting or sent in a form of dedicated signaling.

The following describes the present invention in detail with reference to specific embodiments.

Embodiment 1:

In Embodiment 1, the conditions to prevent the UE reporting the notification message. A multi-card terminal has a card 1 (for example, a SIM card 1) and a card 2 (for example, a SIM card 2). The card 1 corresponds to UE1, and the card 2 corresponds to UE2. The UE1 is in a connected state on a network A, and the UE2 is in an idle state or an inactive state on a network B and is about to enter the connected state. In Embodiment 1, a message notification process may include the following steps.

Step 11: The UE1 is in the connected state on the network A. The following cases may occur at that time so that the UE2 is about to enter the connected state on the network B:

(1) The UE2 receives a paging message from the network B, where the paging message includes a service type of paging, for example, a service type of voice or SMS.

(2) The UE2 proactively triggers a high-priority service on the network B.

(3) The UE2 receives paging from the network B.

(4) The UE2 initiates a service on the network B.

Step 12a: If the UE2 receives the paging message in step 11, the UE1 determines, based on the service type included in the paging message from the network B (the service type may be parsed at an RRC layer or reported by an RRC layer to a higher layer for parsing) and through any one of the following manners, whether to send a leaving message to the network A.

(1) According to a specified rule in a protocol. For example, the protocol may define that "when a service type included in a paging message received by UE is a voice service, UE sends a leaving message." Then, when the paging message received by UE (namely, the UE2) from the network B includes a voice service, UE (namely, the UE1) sends a leaving message to the network A. (Sending the leaving message by the card 1 may be implemented by the terminal, that is, the leaving message triggered by the paging message of the card 2 in the terminal is sent by the card 1.)

(2) According to a network configuration (broadcast or dedicated signaling) received by UE from the network A or the network B. For example, the UE1 receives a broadcast message or dedicated signaling from the network A, and performs the following behavior according to an instruction in the broadcast message or the dedicated signaling: when a paging message received by the UE2 from the network B includes a specific service type, for example, voice, the UE1 sends a leaving message to the network A; alternatively, when a paging message received by the UE1 from the network A includes a specific service type, for example, voice, the UE2 sends a leaving message to the network B. In short, the UE1 determines, based on the network configuration and the service type included in the received paging message, whether to send a leaving message to the network A.

(3) The UE1 itself determines whether to send a leaving message to the network A. For example, the UE1 determines, by itself based on the service type included in the paging message, whether to send a leaving message to the network A; or determines, depending on a connection suspension status of the network A, whether to send a leaving message. For example, if no connection is suspended or a connection is suspended for a short time, the UE1 may choose not to send a leaving message to the network A.

Step 12b: If the UE2 proactively triggers the high-priority service on the network B in step 11, the UE2 determines, through any one of the following manners, whether to send a leaving message to the network A.

(1) According to a specified rule in a protocol. For example, the protocol may define that "when UE initiates a voice service, UE sends a leaving message." Then, when UE (namely, the UE2) initiates a voice service on the network B, UE (namely, the UE1) sends a leaving message to the network A. (Sending the leaving message by the card 1 may be implemented by the terminal, that is, the leaving message triggered by the voice service initiated by the card 2 in the terminal is sent by the card 1.)

(2) According to a network configuration (broadcast or dedicated signaling) received by UE from the network A or the network B. For example, the UE1 receives a broadcast message or dedicated signaling from the network A, and performs the following behavior according to an instruction in the broadcast message or the dedicated signaling: when the UE2 initiates a specific service type on the network B, for example, voice, the UE1 sends a leaving message to the network A; alternatively, when the UE1 initiates a specific service type on the network A, for example, voice, the UE2 sends a leaving message to the network B. In short, the UE1 determines, based on the network configuration and an initiated service type, whether to send a leaving message to the network A.

(3) The UE1 itself determines whether to send a leaving message to the network A. For example, the UE1 determines, by itself based on an initiated service type, whether to send a leaving message to the network A; or determines, depending on a connection suspension status of the network A, whether to send a leaving message. For example, if no connection is suspended or a connection is suspended for a short time, the UE1 may choose not to send a leaving message to the network A.

Step 12c: If the UE2 receives the paging from the network B or initiates the service on the network B in step 11, the UE1 sends a leaving message to the network A.

Step 13: When the UE2 enters the connected state and processes a service, for example, a voice call, on the network B, the UE1 does not receive scheduling on the network A temporarily.

Step 14: If the network A receives the leaving message in step 12a or step 12b, the network A may not schedule the UE1 for a period of time.

Embodiment 2:

In Embodiment 2, the conditions to prevent the UE reporting the notification message. A multi-card terminal has a card 1 (for example, a SIM card 1) and a card 2 (for example, a SIM card 2). The card 1 corresponds to UE1, and the card 2 corresponds to UE2. The UE1 is in an idle state or an inactive state on a network A, and the UE2 is in an idle state or an inactive state on a network B and is about to enter a connected state. In Embodiment 2, a message notification process may include the following steps.

Step 21: The UE1 is in the idle state or the inactive state on the network A. The following cases may occur at this time so that the UE2 is about to enter the connected state on the network B:
  (1) The UE2 receives a paging message from the network B, where the paging message includes a service type of paging, for example, a service type of voice or SMS.
  (2) The UE2 proactively triggers a high-priority service on the network B.
  (3) The UE2 receives paging from the network B.
  (4) The UE2 initiates a service on the network B.

Step 22a: If the UE2 receives the paging message in step 21, the UE1 determines, based on the service type included in the paging message from the network B (the service type may be parsed at an RRC layer or reported by an RRC layer to a higher layer for parsing) and through any one of the following manners, whether to send a leaving message to the network A:
  (1) According to a specified rule in a protocol. For example, the protocol may define that "when a service type included in a paging message received by UE is a voice service, UE sends a leaving message." Then, when the paging message received by UE (namely, the UE2) from the network B includes a voice service, UE (namely, the UE1) sends a leaving message to the network A. (Sending the leaving message by the card 1 may be implemented by the terminal, that is, the leaving message triggered by the paging message of the card 2 in the terminal is sent by the card 1.)
  (2) According to a network configuration (broadcast or dedicated signaling) received by UE from the network A or the network B. For example, the UE1 receives a broadcast message or dedicated signaling from the network A, and performs the following behavior according to an instruction in the broadcast message or the dedicated signaling: when a paging message received by the UE2 from the network B includes a specific service type, for example, voice, the UE1 sends a leaving message to the network A; alternatively, when a paging message received by the UE1 from the network A includes a specific service type, for example, voice, the UE2 sends a leaving message to the network B. In short, the UE1 determines, based on the network configuration and the service type included in the received paging message, whether to send a leaving message to the network A.
  (3) The UE1 itself determines whether to send a leaving message to the network A. For example, the UE1 determines, by itself based on the service type included in the paging message, whether to send a leaving message to the network A.

Step 22b: If the UE2 proactively triggers the high-priority service on the network B in step 21, the UE1 determines, through any one of the following manners, whether to send a leaving message to the network A.
  (1) According to a specified rule in a protocol. For example, the protocol may define that "when UE initiates a voice service, UE sends a leaving message." Then, when UE (namely, the UE2) initiates a voice service on the network B, UE (namely, the UE1) sends a leaving message to the network A. (Sending the leaving message by the card 1 may be implemented by the terminal, that is, the leaving message triggered by the voice service initiated by the card 2 in the terminal is sent by the card 1.)
  (2) According to a network configuration (broadcast or dedicated signaling) received by UE from the network A or the network B. For example, the UE1 receives a broadcast message or dedicated signaling from the network A, and performs the following behavior according to an instruction in the broadcast message or the dedicated signaling: when the UE2 initiates a specific service type on the network B, for example, voice, the UE1 sends a leaving message to the network A; alternatively, when the UE1 initiates a specific service type on the network A, for example, voice, the UE2 sends a leaving message to the network B. In short, the UE1 determines, based on the network configuration and an initiated service type, whether to send a leaving message to the network A.
  (3) The UE1 itself determines whether to send a leaving message to the network A. For example, the UE1 determines, by itself based on an initiated service type, whether to send a leaving message to the network A.

Step 22c: If the UE2 receives the paging from the network B or initiates the service on the network B in step 21, the UE1 sends a leaving message to the network A.

Step 23: If the UE1 determines to send a leaving message to the network A in step 22a or step 22b, the UE1 first initiates random access on the network A and establishes an RRC connection to the network A.

Step 24: The UE1 enters the connected state on the network A, and sends a leaving message to the network A to indicate that the UE1 temporarily stops receiving a paging message.

Step 25: When the UE2 enters the connected state and processes a service, for example, a voice call, on the network B, the UE1 does not monitor a paging message on the network A temporarily.

Step 26: If the network A receives the leaving message in step 22a or step 22b, the network A may not page the UE1 for a period of time.

Embodiment 3:

In Embodiment 3, a notification message frequency is reduced, and a timer is merely used to prohibit sending of a leaving message. A multi-card terminal has a card 1 (for example, a SIM card 1) and a card 2 (for example, a SIM card 2). The card 1 corresponds to UE1, and the card 2 corresponds to UE2. The UE1 is in a connected state on a network A, and the UE2 is in an idle state or an inactive state on a network B and is about to enter the connected state. In Embodiment 3, a message notification process may include the following steps.

Step 31: The UE1 is in the connected state on the network A. The following cases may occur at this time so that the UE2 is about to enter the connected state on the network B:
  (1) The UE2 receives a paging message from the network B, where the paging message includes a service type of paging, for example, a service type of voice or SMS.
  (2) The UE2 proactively triggers a high-priority service on the network B.

Step 32: The UE1 may determine, in either of the following manners, whether to send a leaving message to the network A:
  I. It is pre-defined that the UE1 always sends a leaving message to the network A when leaving the network A.
  II. The manners in step 12a, step 12b, and step 12c in Embodiment 1 are used to determine whether to send a leaving message to the network A.

Step 33: The UE1 determines to send a leaving message to the network A, and starts a timer when the UE1 sends a leaving message. A value of the timer may be specified in a protocol, or may be configured through network broadcasting or dedicated signaling.

Step 34: When the UE2 enters the connected state and processes a service, for example, a voice call, on the network B, the UE1 does not receive scheduling on the network A temporarily.

Step 35: When the UE2 ends the service on the network B, the UE1 is about to return to the network A. At this time, the UE1 optionally notifies the network A, for example, sends a return message to the network A.

Step 36: The UE1 performs switching between networks again, that is, the UE1 is about to leave the network A, and the UE2 enters the connected state on the network B (as described in step 31). In this case, the following several cases may occur:

If the timer expires, the UE1 is allowed to send a leaving message. In this case, step 32 to step 36 are performed again.

If the timer has not expired, the UE1 cannot send a leaving message to the network A before the timer expires. The UE1 can only wait until the timer expires, and then the UE1 can send a leaving message. After that, step 32 to step 36 are performed again.

Step 37: If the UE1 is allowed to send a leaving message again in step 36, the UE1 starts the timer when a leaving message is sent. A new timer configuration value that the UE1 obtains from a broadcast message or dedicated signaling in step 34 to step 36 may be used.

Embodiment 4:

In Embodiment 4, a notification message frequency is reduced, and a timer is merely used to prohibit sending of a return message. A multi-card terminal has a card 1 (for example, a SIM card 1) and a card 2 (for example, a SIM card 2). The card 1 corresponds to UE1, and the card 2 corresponds to UE2. The UE1 is in a connected state on a network A, and the UE2 is in an idle state or an inactive state on a network B and is about to enter the connected state. In Embodiment 4, a message notification process may include the following steps.

Step 41: The UE1 is in the connected state on the network A. The following cases occur at this time so that the UE2 is about to enter the connected state on the network B:

(1) The UE2 receives a paging message from the network B, where the paging message includes a service type of paging, for example, a service type of voice or SMS.

(2) The UE2 proactively triggers a high-priority service on the network B.

Step 42: The UE1 may determine, in either of the following manners, whether to send a leaving message to the network A:

I. It is pre-defined that the UE1 always sends a leaving message to the network A when leaving the network A.

II. The manners in step 12a, step 12b, and step 12c in Embodiment 1 are used to determine whether to send a leaving message to the network A.

Step 43: When the UE2 enters the connected state and processes a service, for example, a voice call, on the network B, the UE1 does not receive scheduling on the network A temporarily.

Step 44: When the UE2 ends the service on the network B, the UE1 is about to return to the network A. At this time, the UE1 sends a return message to the network A and starts a timer. Because the timer is used to prohibit sending of a return message, the timer is started after the return message is sent.

Step 45: The UE1 leaves the network A again. When the UE1 returns to the network A again:

If the timer expires, the UE1 is allowed to send a return message, and start or restart the timer.

If the timer has not expired, the UE1 cannot send a return message to the network A before the timer expires. The UE1 can only wait until the timer expires, and then the UE1 can send a return message.

Step 46: If the UE1 is allowed to send a return message again in step 45, the UE1 starts the timer when a return message is sent. A new timer configuration value that the UE1 obtains from a broadcast message or dedicated signaling in step 44 and step 45 may be used.

Embodiment 5:

In Embodiment 5, a notification message frequency is reduced, and a timer is used to prohibit sending of both a leaving message and a return message. A multi-card terminal has a card 1 (for example, a SIM card 1) and a card 2 (for example, a SIM card 2). The card 1 corresponds to UE1, and the card 2 corresponds to UE2. The UE1 is in a connected state on a network A, and the UE2 is in an idle state or an inactive state on a network B and is about to enter the connected state. In Embodiment 5, a message notification process may include the following steps.

Step 51: The UE1 is in the connected state on the network A. The following cases may occur at this time so that the UE2 is about to enter the connected state on the network B:

(1) The UE2 receives a paging message from the network B, where the paging message includes a service type of paging, for example, a service type of voice or SMS.

(2) The UE2 proactively triggers a high-priority service on the network B.

Step 52: The UE1 may determine, in either of the following manners, whether to send a leaving message to the network A:

I. It is pre-defined that the UE1 always sends a leaving message to the network A when leaving the network A.

II. The manners in step 12a, step 12b, and step 12c in Embodiment 1 are used to determine whether to send a leaving message to the network A.

Step 53: The UE1 determines to send a leaving message to the network A, and starts a timer when the UE1 sends a leaving message. A value of the timer may be specified in a protocol, or may be configured through network broadcasting or dedicated signaling.

Step 54: When the UE2 enters the connected state and processes a service, for example, a voice call, on the network B, the UE1 does not receive scheduling on the network A temporarily.

Step 55: When the UE2 ends the service on the network B, the UE1 is about to return to the network A. In this case, the following several cases may occur:

If the timer expires, the UE1 sends a return message to the network A when returning to the network A. After that, step 51 to step 55 are repeated.

If the timer has not expired, the UE1 is still in a state in which the UE1 is prohibited from notifying the network A. In this case, the UE1 waits for the timer to expire. It may be determined, through a behavior within a waiting period, whether the UE1 will send a return message after the timer expires. That is, during the waiting period:

If the UE2 is not about to enter the connected state on the network B (for the same reason as in step 51) again, the UE1 sends a return message to the network A immediately after the timer expires. After that, step 51 to step 55 are repeated.

If the UE2 enters the connected state and processes a service on the network B (for the same reason as in step 51) one or more times, there is no need to send a return message and/or a leaving message during this period. When the timer expires, the UE1 sends a return message if the UE2 has ended the service. After that, step 51 to step 55 are repeated.

If the UE2 enters the connected state and processes a service on the network B (for the same reason as in step 51) one or more times, there is no need to send a return message and/or a leaving message during this period. When the timer expires, the UE1 is allowed to send a leaving message to the network A if the UE2 has another service (for the same reason as in step 51). After that, step 52 to step 55 are repeated.

Step 56: If the UE1 is allowed to send a leaving message again in step 55, the UE1 starts the timer when a leaving message is sent. A new timer configuration value that the UE1 obtains from a broadcast message or dedicated signaling in step 54 and step 55 may be used.

Embodiment 6:

In Embodiment 6, a notification message frequency is reduced, and a timer is merely used to prohibit sending of a leaving message. A multi-card terminal has a card 1 (for example, a SIM card 1) and a card 2 (for example, a SIM card 2). The card 1 corresponds to UE1, and the card 2 corresponds to UE2. The UE1 is in an idle state or an inactive state on a network A, and the UE2 is in an idle state or an inactive state on a network B and is about to enter a connected state. In Embodiment 6, a message notification process may include the following steps.

Step 61: The UE1 is in the idle state or the inactive state on the network A. The following cases may occur at this time so that the UE2 is about to enter the connected state on the network B:

(1) The UE2 receives a paging message from the network B, where the paging message includes a service type of paging, for example, a service type of voice or SMS.

(2) The UE2 proactively triggers a high-priority service on the network B.

Step 62: The UE1 may determine, in either of the following manners, whether to send a leaving message to the network A:

I. It is pre-defined that the UE1 always sends a leaving message to the network A when leaving the network A.

II. The manners in step 22a, step 22b, and step 22c in Embodiment 2 are used to determine whether to send a leaving message to the network A.

Step 63: If the UE1 determines to send a leaving message to the network A, the UE1 first initiates random access on the network A and establishes an RRC connection to the network A.

Step 64: The UE1 enters the connected state on the network A, and sends a leaving message to the network A to indicate that the UE1 temporarily stops receiving a paging message.

Step 65: When sending a leaving message, the UE1 starts a timer. A value of the timer may be specified in a protocol, or may be configured through network broadcasting or dedicated signaling.

Step 66: When the UE2 enters the connected state and processes a service, for example, a voice call, on the network B, the UE1 does not monitor a paging message on the network A temporarily.

Step 67: When the UE2 ends the service on the network B, the UE1 may notify the network A that the UE1 may continue monitoring paging. For example, the UE1 initiates random access and enters the connected state on the network A, and sends a return message to the network A.

Step 68: The UE1 performs switching between networks again, that is, the UE1 is about to leave the network A, and the UE2 enters the connected state on the network B (as described in step 61). In this case, the following several cases may occur:

If the timer expires, the UE1 is allowed to send a leaving message. In this case, step 62 to step 68 are performed again.

If the timer has not expired, the UE1 cannot send a leaving message to the network A before the timer expires. The UE1 can only wait until the timer expires, and then the UE1 can send a leaving message. After that, step 62 to step 68 are performed again.

Step 69: In step 64 and step 65, the UE1 may read a new timer configuration in a broadcast message. When leaving the network A again, the UE1 sends an uplink leaving message and starts the timer. The new configuration value may be used as a value of the timer.

Embodiment 7:

In Embodiment 7, a notification message frequency is reduced, and a timer is merely used to prohibit sending of a return message. A multi-card terminal has a card 1 (for example, a SIM card 1) and a card 2 (for example, a SIM card 2). The card 1 corresponds to UE1, and the card 2 corresponds to UE2. The UE1 is in an idle state or an inactive state on a network A, and the UE2 is in an idle state or an inactive state on a network B and is about to enter a connected state. In Embodiment 7, a message notification process may include the following steps.

Step 71: The UE1 is in the idle state or the inactive state on the network A. The following cases occur at this time so that the UE2 is about to enter the connected state on the network B:

(1) The UE2 receives a paging message from the network B, where the paging message includes a service type of paging, for example, a service type of voice or SMS.

(2) The UE2 proactively triggers a high-priority service on the network B.

Step 72: The UE1 may determine, in either of the following manners, whether to send a leaving message to the network A:

I. It is pre-defined that the UE1 always sends a leaving message to the network A when leaving the network A.

II. The manners in step 22a, step 22b, and step 22c in Embodiment 2 are used to determine whether to send a leaving message to the network A.

Step 73: If the UE1 determines to send a leaving message to the network A in step 72, the UE1 first initiates random access on the network A and establishes an RRC connection to the network A.

Step 74: The UE1 enters the connected state on the network A, and sends a leaving message to the network A to indicate that the UE1 temporarily stops receiving a paging message.

Step 75: When the UE2 enters the connected state and processes a service, for example, a voice call, on the network B, the UE1 does not monitor a paging message on the network A temporarily.

Step 76: When the UE2 ends the service on the network B, the UE1 may notify the network A that the UE1 may continue monitoring paging (it is considered that the UE1 returns to the network A). In this case, the UE1 sends a return message to the network A (first initiates random access and then enters an RRC connected state to send the return message) and starts the timer.

Step 77: The UE1 leaves the network A again. When the UE1 returns to the network A again:

If the timer expires, the UE1 is allowed to send a return message (first initiate random access and then enter the RRC connected state to send the return message) and start or restart the timer.

If the timer has not expired, the UE1 cannot send a return message to the network A before the timer expires. The UE1 can only wait until the timer expires, and then the UE1 can send a return message (first initiate random access and then enter the RRC connected state to send the return message).

Step 78: If the UE1 is allowed to send a return message again in step 77, the UE1 starts the timer when a return message is sent. A new timer configuration value that the UE1 obtains from a broadcast message or dedicated signaling in step 76 and step 77 may be used.

Embodiment 8:

In Embodiment 8, a notification message frequency is reduced, and a timer is used to prohibit sending of both a leaving message and a return message. A multi-card terminal has a card 1 (for example, a SIM card 1) and a card 2 (for example, a SIM card 2). The card 1 corresponds to UE1, and the card 2 corresponds to UE2. The UE1 is in an idle state or an inactive state on a network A, and the UE2 is in an idle state or an inactive state on a network B and is about to enter a connected state. In Embodiment 8, a message notification process may include the following steps.

Step 81: The UE1 is in the idle state or the inactive state on the network A. The following cases may occur at this time so that the UE2 is about to enter the connected state on the network B:

(1) The UE2 receives a paging message from the network B, where the paging message includes a service type of paging, for example, a service type of voice or SMS.

(2) The UE2 proactively triggers a high-priority service on the network B.

Step 82: The UE1 may determine, in either of the following manners, whether to send a leaving message to the network A:

I. It is pre-defined that the UE1 always sends a leaving message to the network A when leaving the network A.

II. The manners in step 22a, step 22b, and step 22c in Embodiment 2 are used to determine whether to send a leaving message to the network A.

Step 83: If the UE1 determines to send a leaving message to the network A in step 82, the UE1 first initiates random access on the network A and establishes an RRC connection to the network A.

Step 84: The UE1 enters the connected state on the network A, and sends a leaving message to the network A to indicate that the UE1 temporarily stops receiving a paging message.

Step 85: When sending a leaving message, the UE1 starts a timer. A value of the timer may be specified in a protocol, or may be configured through network broadcasting or dedicated signaling.

Step 86: When the UE2 enters the connected state and processes a service, for example, a voice call, on the network B, the UE1 does not monitor a paging message on the network A temporarily.

Step 87: When the UE2 ends the service on the network B, the UE1 may notify the network A that the UE1 may continue monitoring paging (it is considered that the UE1 returns to the network A). In this case, the following several cases may occur:

If the timer expires, the UE1 immediately notifies the network A when returning to the network A. For example, the UE1 initiates random access (RACH) and enters the connected state on the network A, and sends a return message to the network A. After that, step 81 to step 87 are repeated.

If the timer has not expired, the UE1 is still in a state in which the UE1 is prohibited from notifying the network A. In this case, the UE1 waits for the timer to expire. It may be determined, through a behavior within a waiting period, whether the UE1 will send a return message after the timer expires. That is, during the waiting period:

If the UE2 is not about to enter the connected state on the network B (for the same reason as in step 81) again, after the timer expires, the UE1 initiates random access and enters the connected state on the network A, and sends a return message to the network A. After that, step 81 to step 87 are repeated.

If the UE2 enters the connected state and processes a service on the network B (for the same reason as in step 51) one or more times, there is no need to send a return message and/or a leaving message during this period. When the timer expires, if the UE2 has ended the service, the UE1 initiates random access and enters the connected state on the network A, and sends a return message. After that, step 81 to step 87 are repeated.

If the UE2 enters the connected state and processes a service on the network B (for the same reason as in step 81) one or more times, there is no need to send a return message and/or a leaving message during this period. When the timer expires, if of the UE2 has another service (for the same reason as in step 81), the UE1 is allowed to initiate random access and enter the connected state on the network A, and send a leaving message to the network A. After that, step 82 to step 87 are repeated.

Step 88: If the UE1 is allowed to send a leaving message again in step 85, the UE1 starts the timer when a leaving message is sent. A new timer configuration value that the UE1 obtains from a broadcast message or dedicated signaling in step 86 and step 87 may be used.

Figure 2:
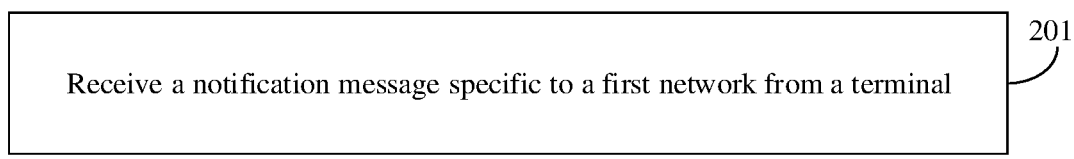
FIG. 2 is a flowchart of another message notification method according to an embodiment of the present invention.

Referring to FIG. 2, FIG. 2 is a flowchart of a message notification method according to an embodiment of the present invention. The method is applied to a network device, and the network device corresponds to a first network. As shown in FIG. 2, the method includes the following step:

Step 201: Receive a notification message specific to the first network from a terminal.

The notification message is sent by the terminal when a first condition is met. The first condition includes any one of the following:

a notification message reporting condition; or a first timer expires or is not running, where the first timer is used to prohibit the terminal from sending the notification message.

In this way, during switching between different networks, when leaving a network, the terminal may send a notification message to notify the network to suspend a connection or suspend paging, thereby preventing wastes of network resources and decreasing network signaling overheads. Further, during frequent switching between the different networks, the notification message reporting condition and/or a timer may also be used to reduce a notification message reporting frequency, so as to avoid frequently receiving notification messages from a multi-card terminal in a case of network congestion and avoid signaling overload on a corresponding network.

Optionally, the notification message reporting condition includes any one of the following:
- a service type of paging received by the terminal from a second network is a preset service type;
- a service type triggered by the terminal on a second network is a preset service type;
- the terminal receives paging from a second network;
- the terminal initiates a service on a second network;
- the terminal ends a service conforming to a preset service type on a second network; or
- the terminal ends a service on a second network.

Optionally, the notification message reporting condition may be determined by the terminal based on at least one of the following:
- a network configuration, a specified rule in a protocol, or a status of the terminal itself.

Optionally, a running duration threshold of the first timer is specified in a protocol; or a running duration threshold of the first timer is configured by the network device for the terminal by using dedicated signaling or broadcast system information.

Optionally, after step 201, the method further includes:
determining, according to content indicated by the notification message, whether to schedule or page the terminal through the first network.

Optionally, the foregoing notification message may be used to indicate leaving a network or returning to a network, and may include at least one of a leaving message or a return message. The leaving message is used to notify the network when the terminal leaves the network, that is, indicate that UE (a SIM card) corresponding to the network temporarily leaves the network and does not receive scheduling and/or monitor a paging message during a leaving period, or indicate the network not to page the terminal or schedule the terminal. Optionally, a time range may be further provided to indicate not to page the terminal or schedule the terminal during the time range. The return message is used to notify the network when the terminal returns to the network, that is, indicate that the UE (the SIM card) corresponding to the network returns to the network and may continue receiving scheduling or monitoring a paging message.

Moreover, in addition to defining the notification message as the leaving message and/or the return message (other names may be used for the leaving message and the return message), the notification message may be used to directly indicate leaving a network or returning to a network. This is not limited in the embodiments of the present invention.

In an implementation, the notification message, for example, the leaving message or the return message, may be sent in any uplink message. For example, when being sent through an RRC message/NAS message, the leaving message may be represented by 1 bit, with 0 indicating not scheduling the terminal and 1 indicating not paging the terminal; and the return message may be represented by 1 bit, with 0 indicating that the terminal may be scheduled again and 1 indicating that the terminal may be paged again. Alternatively, the notification message may be represented by 2 bits. When the first bit is 0, it indicates not scheduling the terminal;
and when the first bit is 1, it indicates that the terminal may be scheduled again. When the second bit is 0, it indicates not paging the terminal; and when the second bit is 1, it indicates that the terminal may be paged again.

The foregoing embodiments describe the message notification methods of the present invention. The following describes a terminal and a network device of the present invention with reference to the embodiments and accompanying drawings.

Figure 3:
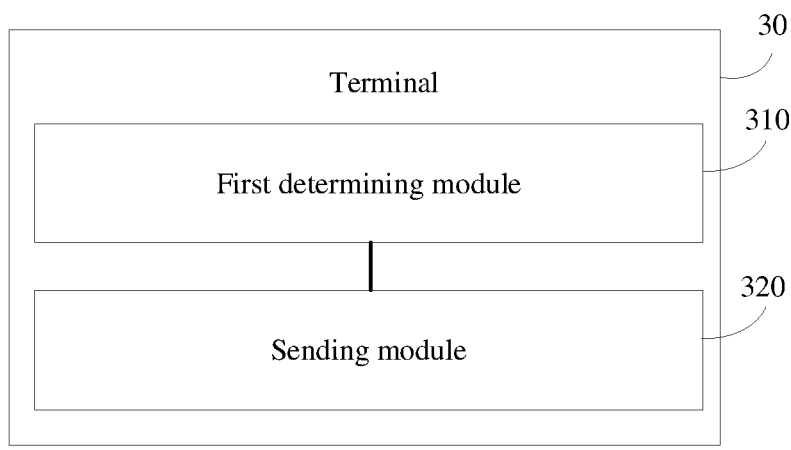
FIG. 3 is a first schematic structural diagram of a terminal according to an embodiment of the present invention.

Referring to FIG. 3, FIG. 3 is a schematic structural diagram of a terminal according to an embodiment of the present invention. As shown in FIG. 3, the terminal 30 includes:
- a first determining module 310, configured to determine whether a first condition is met; and
- a sending module 320, configured to: send a notification message to a first network when the first condition is met, or skip sending a notification message to a first network when the first condition is not met.

The first condition includes any one of the following:
- a notification message reporting condition; or
- a first timer expires or is not running, where the first timer is used to prohibit the terminal from sending the notification message.

Optionally, the notification message includes at least one of a leaving message or a return message.

Optionally, the notification message reporting condition includes any one of the following:
- a service type of paging received by the terminal from a second network is a preset service type;
- a service type triggered by the terminal on a second network is a preset service type;
- the terminal receives paging from a second network;
- the terminal initiates a service on a second network;
- the terminal ends a service conforming to a preset service type on a second network; or
- the terminal ends a service on a second network.

Optionally, the preset service type includes any one of the following:
voice, short message, RRC signaling, or NAS signaling.

Optionally, the notification message reporting condition is determined by the terminal based on at least one of the following:
- a network configuration, a specified rule in a protocol, or a status of the terminal itself.

Optionally, the network configuration is sent to the terminal by using any one of the following:
broadcast system information or dedicated signaling.

Optionally, a running duration threshold of the first timer is specified in a protocol; or a running duration threshold of the first timer is configured for the terminal by using dedicated signaling or broadcast system information.

Optionally, a startup condition of the first timer is that the terminal sends the notification message to the first network.

Optionally, a stop condition of the first timer includes any one of the following:
- running duration of the first timer reaches a preset threshold; or
- a new timer parameter value is reconfigured for the first timer.

The terminal 30 in this embodiment of the present invention may implement the processes implemented in the method embodiment shown in FIG. 1 and achieve the same beneficial effects. To avoid repetition, details are not described herein again.

Figure 4:
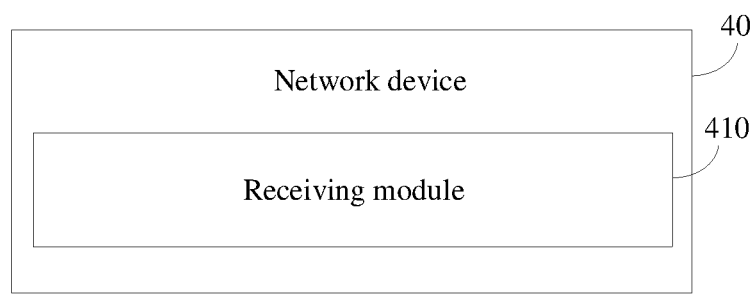
FIG. 4 is a first schematic structural diagram of a network device according to an embodiment of the present invention.

Referring to FIG. 4, FIG. 4 is a schematic structural diagram of a network device according to an embodiment of the present invention. As shown in FIG. 4, the network device 40 includes:
- a receiving module 410, configured to receive a notification message specific to a first network from a terminal.

The notification message is sent by the terminal when a first condition is met. The first condition includes any one of the following:
  a notification message reporting condition; or
  a first timer expires or is not running, where the first timer is used to prohibit the terminal from sending the notification message.

Optionally, the notification message includes at least one of a leaving message or a return message.

Optionally, the notification message reporting condition includes any one of the following:
  a service type of paging received by the terminal from a second network is a preset service type;
  a service type triggered by the terminal on a second network is a preset service type;
  the terminal receives paging from a second network;
  the terminal initiates a service on a second network;
  the terminal ends a service conforming to a preset service type on a second network; or
  the terminal ends a service on a second network.

Optionally, the notification message reporting condition is determined by the terminal based on at least one of the following:
  a network configuration;
  a specified rule in a protocol; or
  a status of the terminal itself.

Optionally, a running duration threshold of the first timer is specified in a protocol; or a running duration threshold of the first timer is configured by the network device for the terminal by using dedicated signaling or broadcast system information.

Optionally, the network device 40 further includes:
  a determining module, configured to determine, according to content indicated by the notification message, whether to schedule or page the terminal through the first network.

The network device 40 in this embodiment of the present invention may implement the processes implemented in the method embodiment shown in FIG. 2 and achieve the same beneficial effects. To avoid repetition, details are not described herein again.

An embodiment of the present invention further provides a communications device, including a processor, a memory, and a computer program stored in the memory and capable of running on the processor. When the computer program is executed by the processor, the processes of the method embodiment shown in FIG. 1 or FIG. 2 are implemented, with the same technical effects achieved. To avoid repetition, details are not described herein again. Optionally, the communications device may be a terminal or a network device.

Figure 5:
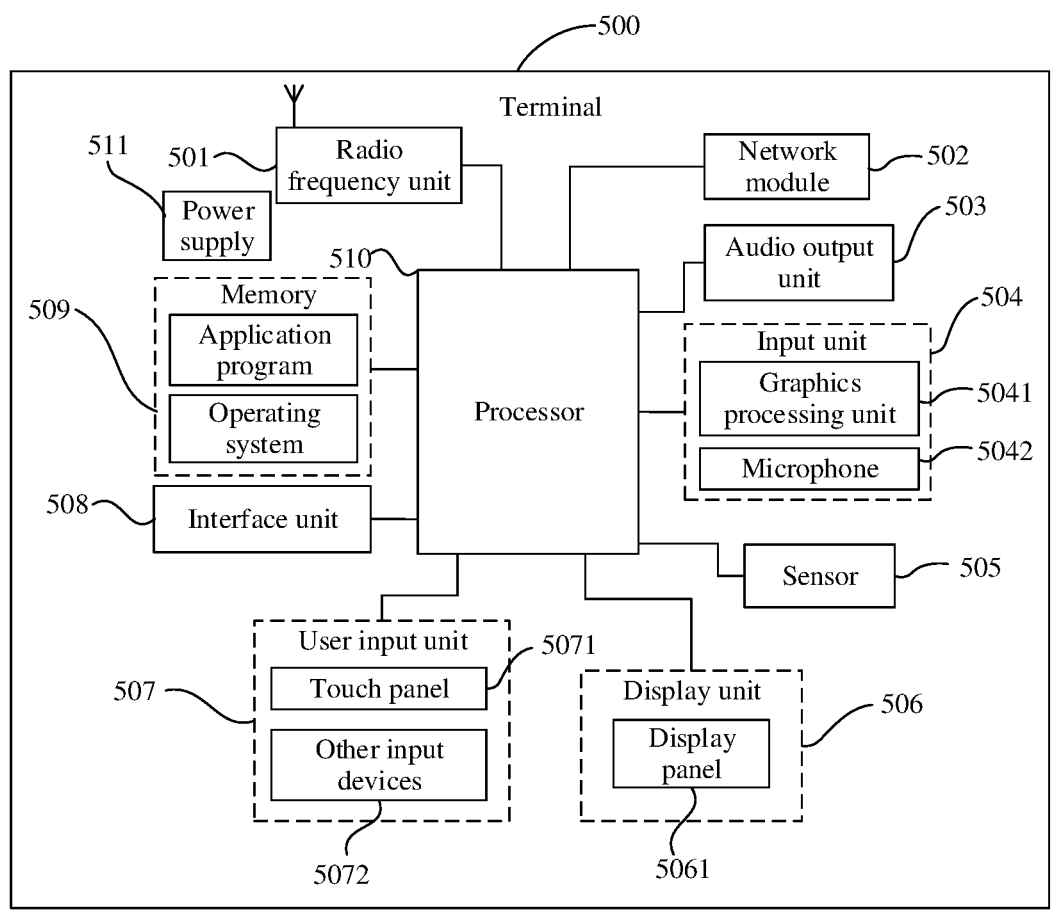
FIG. 5 is a second schematic structural diagram of a terminal according to an embodiment of the present invention.

Specifically, FIG. 5 is a schematic diagram of a hardware structure of a terminal for implementing the embodiments of the present invention. A terminal 500 includes but is not limited to components such as a radio frequency unit 501, a network module 502, an audio output unit 503, an input unit 504, a sensor 505, a display unit 506, a user input unit 507, an interface unit 508, a memory 509, a processor 510, and a power supply 511. A person skilled in the art may understand that the structure of the terminal shown in FIG. 5 does not constitute a limitation on the terminal. The terminal may include more or fewer components than those shown in the figure, or some components are combined, or component arrangements are different. In this embodiment of the present invention, the terminal includes but is not limited to a mobile phone, a tablet personal computer, a notebook computer, a palmtop computer, a vehicle-mounted terminal, a wearable device, a pedometer, or the like.

The processor 510 is configured to determine whether a first condition is met. The first condition includes any one of the following: a notification message reporting condition; or a first timer expires or is not running, where the first timer is used to prohibit the terminal from sending a notification message.

The radio frequency unit 501 is configured to: send the notification message to a first network when the first condition is met, or skip sending the notification message to a first network when the first condition is not met.

The terminal 500 in this embodiment of the present invention may implement the processes implemented in the method embodiment shown in FIG. 1 and achieve the same beneficial effects. To avoid repetition, details are not described herein again.

It should be understood that in this embodiment of the present invention, the radio frequency unit 501 may be configured to send and receive signals in an information sending and receiving process or in a call process. Specifically, after receiving downlink data from a base station, the radio frequency unit 501 sends the downlink data to the processor 510 for processing; in addition, the radio frequency unit 501 sends uplink data to the base station. Generally, the radio frequency unit 501 includes but is not limited to an antenna, at least one amplifier, a transceiver, a coupler, a low noise amplifier, a duplexer, and the like. In addition, the radio frequency unit 501 may further communicate with a network and another device through a wireless communications system.

The terminal provides a user with wireless broadband Internet access by using the network module 502, for example, helps the user send or receive an email, browse a web page, access streaming media, and the like.

The audio output unit 503 may convert audio data into an audio signal, and output the audio signal as sound, where the audio data is received by the radio frequency unit 501 or the network module 502, or stored in the memory 509. In addition, the audio output unit 503 may further provide audio output (for example, a call signal reception tone or a message reception tone) that is related to a specific function performed by the terminal 500. The audio output unit 503 includes a speaker, a buzzer, a telephone receiver, and the like.

The input unit 504 is configured to receive an audio or video signal. The input unit 504 may include a graphics processing unit (GPU) 5041 and a microphone 5042. The graphics processing unit 5041 processes image data of a static picture or a video that is obtained by an image capture apparatus (for example, a camera) in a video capture mode or an image capture mode. A processed image frame may be displayed on the display unit 506. An image frame processed by the graphics processing unit 5041 may be stored in the memory 509 (or another storage medium) or sent by the radio frequency unit 501 or the network module 502. The microphone 5042 may receive a sound and may process the sound into audio data. The processed audio data may be converted, in a telephone call mode for outputting, into a format that may be sent to a mobile communications base station through the radio frequency unit 501.

The terminal 500 further includes at least one sensor 505, for example, an optical sensor, a motion sensor, and other sensors. Specifically, the optical sensor includes an ambient light sensor and a proximity sensor. The ambient light sensor may adjust brightness of a display panel 5061 based on intensity of ambient light. When the terminal 500 moves near an ear, the proximity sensor may disable the display panel 5061 and/or backlight. As a type of motion sensor, an accelerometer sensor can detect magnitudes of accelerations in all directions (usually three axes), can detect a magnitude and a direction of gravity when being static, and can be applied to terminal posture recognition (such as screen switching between portrait and landscape, related games, and magnetometer posture calibration), functions related to vibration recognition (such as a pedometer and tapping), and the like. The sensor 505 may also include a fingerprint sensor, a pressure sensor, an iris sensor, a molecular sensor, a gyroscope, a barometer, a hygrometer, a thermometer, an infrared sensor, and the like. Details are not described herein.

The display unit 506 is configured to display information input by the user or information provided for the user. The display unit 506 may include the display panel 5061. The display panel 5061 may be configured in a form of a liquid crystal display (LCD), an organic light-emitting diode (OLED), or the like.

The user input unit 507 may be configured to receive input digit or character information, and generate key signal input that is related to user setting and function control of the terminal. Specifically, the user input unit 507 includes a touch panel 5071 and other input devices 5072. The touch panel 5071, also referred to as a touchscreen, may collect a touch operation performed by the user on or near the touch panel 5071 (for example, an operation performed by the user on the touch panel 5071 or near the touch panel 5071 by using any appropriate object or accessory such as a finger or a stylus). The touch panel 5071 may include two parts: a touch detection apparatus and a touch controller. The touch detection apparatus detects a touch direction of the user, detects a signal generated by a touch operation, and transmits the signal to the touch controller. The touch controller receives touch information from the touch detection apparatus, converts the touch information into touch point coordinates, sends the coordinates to the processor 510, and receives and executes a command sent by the processor 510. In addition, the touch panel 5071 may be implemented in a plurality of forms, for example, a resistive, capacitive, infrared, or surface acoustic wave touch panel. The user input unit 507 may further include the other input devices 5072 in addition to the touch panel 5071. Specifically, the other input devices 5072 may include but are not limited to a physical keyboard, a function key (such as a volume control key or an on/off key), a trackball, a mouse, and a joystick. Details are not described herein.

Further, the touch panel 5071 may cover the display panel 5061. When detecting a touch operation on or near the touch panel 5071, the touch panel 5071 transmits the touch operation to the processor 510 to determine a type of a touch event. Then, the processor 510 provides a corresponding visual output on the display panel 5061 based on the type of the touch event. Although the touch panel 5071 and the display panel 5061 are used as two separate components to implement input and output functions of the terminal in FIG. 5, the touch panel 5071 and the display panel 5061 may be integrated to implement the input and output functions of the terminal in some embodiments. This is not specifically limited herein.

The interface unit 508 is an interface for connecting an external apparatus to the terminal 500. For example, the external apparatus may include a wired or wireless headphone port, an external power supply (or battery charger) port, a wired or wireless data port, a memory card port, a port for connecting an apparatus provided with an identification module, an audio input/output (I/O) port, a video I/O port, or an earphone port. The interface unit 508 may be configured to receive input (for example, data information and electric power) from the external apparatus, and transmit the received input to one or more elements in the terminal 500; or may be configured to transmit data between the terminal 500 and the external apparatus.

The memory 509 may be configured to store a software program and various data. The memory 509 may mainly include a program storage area and a data storage area. The program storage area may store an operating system, an application program required for at least one function (such as a sound play function and an image play function), and the like. The data storage area may store data (such as audio data and a phone book) created based on use of the terminal 500, and the like. In addition, the memory 509 may include a high-speed random access memory, or may include a non-volatile memory, for example, at least one magnetic disk storage device, a flash memory device, or another volatile solid-state storage device.

The processor 510 is a control center of the terminal, and is connected to all components of the terminal by using various interfaces and lines. By running or executing a software program and/or a module stored in the memory 509 and invoking data stored in the memory 509, the processor 510 executes various functions of the terminal and processes data, so as to perform overall monitoring on the terminal. The processor 510 may include one or more processing units. Preferably, an application processor and a modem processor may be integrated into the processor 510. The application processor mainly processes an operating system, a user interface, an application program, and the like. The modem processor mainly processes wireless communication. It may be understood that the modem processor may alternatively not be integrated into the processor 510.

The terminal 500 may further include the power supply 511 (such as a battery) supplying power to each component. Preferably, the power supply 511 may be logically connected to the processor 510 by using a power management system, so that functions such as charge and discharge management and power consumption management are implemented by using the power management system.

In addition, the terminal 500 may further include some functional modules that are not shown. Details are not described herein.

Figure 6:
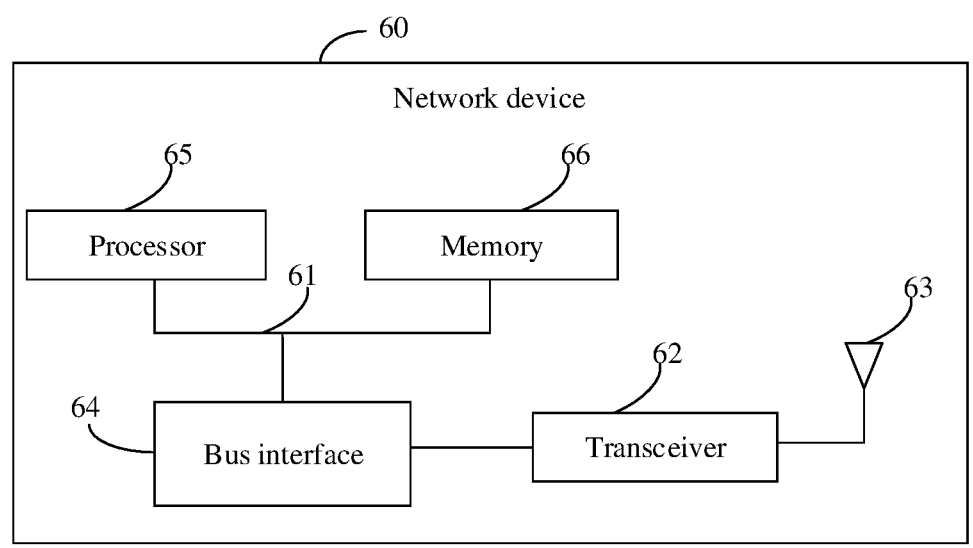
FIG. 6 is a second schematic structural diagram of a network device according to an embodiment of the present invention.

Referring to FIG. 6, FIG. 6 is a schematic diagram of a hardware structure of a network device for implementing the embodiments of the present invention. The network device 60 includes but is not limited to a bus 61, a transceiver 62, an antenna 63, a bus interface 64, a processor 65, and a memory 66.

In this embodiment of the present invention, the network device 60 further includes a computer program stored in the memory 66 and capable of running on the processor 65. When the computer program is executed by the processor 65, the following step is implemented:

receiving a notification message specific to a first network from a terminal, where the notification message is sent by the terminal when a first condition is met, and the first condition includes any one of the following:

a notification message reporting condition; or a first timer expires or is not running, where the first timer is used to prohibit the terminal from sending the notification message.

The transceiver 62 is configured to transmit and receive data under control of the processor 65.

The network device 60 in this embodiment of the present invention may implement the processes implemented in the method embodiment shown in FIG. 2 and achieve the same beneficial effects. To avoid repetition, details are not described herein again.

In FIG. 6, in a bus architecture (represented by the bus 61), the bus 61 may include any quantity of interconnected buses and bridges, and the bus 61 connects various circuits that include one or more processors represented by the processor 65 and a memory represented by the memory 66. The bus 61 may further interconnect various other circuits such as a peripheral device, a voltage regulator, and a power management circuit. These are common sense in the art, and therefore are not further described in this specification. The bus interface 64 provides an interface between the bus 61 and the transceiver 62. The transceiver 62 may be one member, or may be a plurality of members, for example, a plurality of receivers and transmitters, and provides a unit for communicating with various other apparatuses on a transmission medium. Data processed by the processor 65 is transmitted on a wireless medium through the antenna 63. Further, the antenna 63 further receives data and transmits the data to the processor 65.

The processor 65 is responsible for managing the bus 61 and general processing, and may further provide various functions, including timing, a peripheral interface, voltage regulation, power management, and other control functions. The memory 66 may be configured to store data used by the processor 65 when the processor 65 performs an operation.

Optionally, the processor 65 may be a CPU, an ASIC, an FPGA, or a CPLD.

An embodiment of the present invention further provides a computer-readable storage medium, where a computer program is stored in the computer-readable storage medium. When the computer program is executed by a processor, the processes of the method embodiment shown in FIG. 1 or FIG. 2 may be implemented, with the same technical effects achieved. To avoid repetition, details are not described herein again. The computer-readable storage medium is, for example, a read-only memory (ROM), a random access memory (RAM), a magnetic disk, or an optical disc.

It should be noted that in this specification, the term "comprise", "include", or any other variant thereof is intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element.

According to the description of the foregoing implementations, a person skilled in the art can clearly understand that the methods in the foregoing embodiments may be implemented by software in addition to a necessary universal hardware platform or by hardware only. In most cases, the former is a more preferred implementation. Based on such an understanding, the technical solutions of the present invention essentially, or the part contributing to the prior art may be implemented in a form of a software product. The software product is stored in a storage medium (for example, ROM/RAM, a magnetic disk, or an optical disc), and includes several instructions for instructing a terminal (which may be a mobile phone, a computer, a server, an air conditioner, a network device, or the like) to perform the method described in the embodiments of the present invention.

The embodiments of the present invention are described above with reference to the accompanying drawings, but the present invention is not limited to the foregoing specific embodiments. The foregoing specific embodiments are only illustrative rather than restrictive. Inspired by the present invention, a person of ordinary skill in the art can still derive a plurality of variations without departing from the essence of the present invention and the protection scope of the claims. All these variations shall fall within the protection of the present invention.

What is claimed is:

1. A message notification method, performed by a terminal and comprising:
   determining whether a first condition is met; and
   sending a notification message to a first network when the first condition is met; or
   skipping sending a notification message to a first network when the first condition is not met; wherein
   the terminal is a multi-SIM terminal;
   the first condition comprises:
   a first timer expires or is not running, wherein the first timer is used to prohibit the terminal from sending the notification message;
   wherein the first timer is started or restarted when the terminal sends the notification message to the first network;
   wherein the notification message is used to notify the first network that the terminal will stop receiving scheduling or monitoring a paging message on the first network, or the notification message is used to require allocation of a time division multiplexing (TDM) mode.

2. The method according to claim 1, wherein the notification message comprises at least one of a leaving message or a return message.

3. The method according to claim 1, wherein the first condition further comprises: a notification message reporting condition;
   wherein the notification message reporting condition comprises any one of the following:
   a service type of paging received by the terminal from a second network is a preset service type;
   a service type triggered by the terminal on a second network is a preset service type;
   the terminal receives paging from a second network;
   the terminal initiates a service on a second network;
   the terminal ends a service conforming to a preset service type on a second network; or
   the terminal ends a service on a second network.

4. The method according to claim 3, wherein the preset service type comprises any one of the following:
   voice, short message, radio resource control (RRC) signaling, or non-access stratum (NAS) signaling.

5. The method according to claim 1, wherein the first condition further comprises: a notification message reporting condition;
   wherein the notification message reporting condition is determined by the terminal based on at least one of the following:
   a network configuration;
   a specified rule in a protocol; or
   a status of the terminal itself.

6. The method according to claim 5, wherein the network configuration is sent to the terminal by using any one of the following:
   broadcast system information or dedicated signaling.

7. The method according to claim 1, wherein a running duration threshold of the first timer is specified in a protocol; or
a running duration threshold of the first timer is configured for the terminal by using dedicated signaling or broadcast system information.

8. The method according to claim 1, wherein a stop condition of the first timer comprises any one of the following:
running duration of the first timer reaches a preset threshold; or
a new timer parameter value is reconfigured for the first timer.

9. A message notification method, performed by a network device and comprising:
receiving a notification message specific to a first network from a terminal, wherein
the terminal is a multi-SIM terminal;
the notification message is sent by the terminal when a first condition is met, and the first condition comprises:
a first timer expires or is not running, wherein the first timer is used to prohibit the terminal from sending the notification message;
wherein the first timer is started or restarted when the terminal sends the notification message to the first network;
wherein the notification message is used to notify the first network that the terminal will stop receiving scheduling or monitoring a paging message on the first network, or the notification message is used to require allocation of a time division multiplexing (TDM) mode.

10. The method according to claim 9, wherein
the notification message comprises at least one of a leaving message or a return message.

11. The method according to claim 9, wherein the first condition further comprises: a notification message reporting condition;
wherein the notification message reporting condition comprises any one of the following:
a service type of paging received by the terminal from a second network is a preset service type;
a service type triggered by the terminal on a second network is a preset service type;
the terminal receives paging from a second network;
the terminal initiates a service on a second network;
the terminal ends a service conforming to a preset service type on a second network; or
the terminal ends a service on a second network.

12. The method according to claim 9, wherein the first condition further comprises: a notification message reporting condition;
wherein the notification message reporting condition is determined by the terminal based on at least one of the following:
a network configuration;
a specified rule in a protocol; or
a status of the terminal itself.

13. The method according to claim 9, wherein a running duration threshold of the first timer is specified in a protocol; or
a running duration threshold of the first timer is configured by the network device for the terminal by using dedicated signaling or broadcast system information.

14. The method according to claim 9, wherein after the receiving a notification message specific to a first network from a terminal, the method further comprises:
determining, according to content indicated by the notification message, whether to schedule or page the terminal through the first network.

15. A network device, comprising a memory, a processor, and a computer program stored in the memory and capable of running on the processor, wherein when the computer program is executed by the processor, the steps of the message notification method according to claim 10 are implemented.

16. A terminal, comprising a memory, a processor, and a computer program stored in the memory and capable of running on the processor, wherein when the computer program is executed by the processor, the following steps are implemented:
determining whether a first condition is met; and
sending a notification message to a first network when the first condition is met; or
skipping sending a notification message to a first network when the first condition is not met; wherein
the terminal is a multi-SIM terminal;
the first condition comprises:
a first timer expires or is not running, wherein the first timer is used to prohibit the terminal from sending the notification message;
wherein the first timer is started or restarted when the terminal sends the notification message to the first network;
wherein the notification message is used to notify the first network that the terminal will stop receiving scheduling or monitoring a paging message on the first network, or the notification message is used to require allocation of a time division multiplexing (TDM) mode.

17. The terminal according to claim 16, wherein the first condition further comprises: a notification message reporting condition;
wherein the notification message reporting condition comprises any one of the following:
a service type of paging received by the terminal from a second network is a preset service type;
a service type triggered by the terminal on a second network is a preset service type;
the terminal receives paging from a second network;
the terminal initiates a service on a second network;
the terminal ends a service conforming to a preset service type on a second network; or
the terminal ends a service on a second network.

18. The terminal according to claim 16, wherein a running duration threshold of the first timer is specified in a protocol; or
a running duration threshold of the first timer is configured for the terminal by using dedicated signaling or broadcast system information.

19. The terminal according to claim 16, wherein the first condition further comprises: a notification message reporting condition;
wherein the notification message reporting condition is determined by the terminal based on at least one of the following:
a network configuration;
a specified rule in a protocol; or
a status of the terminal itself.

* * * * *